United States Patent [19]

Miyake et al.

[11] 4,024,076

[45] May 17, 1977

[54] PROCESS FOR PRODUCING GRANULAR SULFURIZED MATERIAL, GRANULAR CARBON OR GRANULAR ACTIVATED CARBON

[75] Inventors: Hiroshi Miyake, Tokyo; Makoto Iriuchijima; Eiji Takahashi, both of Soka; Kiyoshi Terata, Saitama; Hiroki Kamiyama, Soka; Masami Kurihara, Kohsigaya; Etsuo Suzuki, Saitama; Tsutomu Idai, Soka, all of Japan

[73] Assignee: Maruzen Oil Co. Ltd., Osaka, Japan

[22] Filed: Dec. 5, 1974

[21] Appl. No.: 530,270

[30] Foreign Application Priority Data

Dec. 5, 1973 Japan ............... 48-137086
Dec. 11, 1973 Japan ............... 48-137419

[52] U.S. Cl. ................ 252/422; 208/44; 260/139; 252/447; 423/445; 423/447.4; 106/274

[51] Int. Cl.² .......... C01B 31/10; C01B 31/02; C10C 31/02; C07G 17/00

[58] Field of Search .......... 252/422, 444, 445, 447; 423/449, 445; 264/29, 117; 208/6, 44; 106/274, 275; 260/139; 201/6, 25

[56] References Cited

UNITED STATES PATENTS

| | | | |
|---|---|---|---|
| 2,447,004 | 8/1948 | Gamson | 260/139 |
| 2,546,903 | 3/1951 | Morrell | 252/422 |
| 2,585,454 | 2/1952 | Gamson | 252/422 |
| 2,829,115 | 4/1958 | Bushong | 252/422 |
| 3,248,303 | 4/1966 | Doying | 252/422 |
| 3,284,371 | 11/1966 | Krellner | 423/449 |
| 3,775,344 | 11/1973 | Amagi et al. | 252/444 |
| 3,862,962 | 1/1975 | Hanamura et al. | 252/422 |
| 3,886,088 | 5/1975 | DeJong | 252/422 |
| 3,940,344 | 2/1976 | Yokogawa et al. | 252/422 |

*Primary Examiner*—Winston A. Douglas
*Assistant Examiner*—P. E. Konopka
*Attorney, Agent, or Firm*—Sughrue, Rothwell, Mion, Zinn & Macpeak

[57] ABSTRACT

A process for producing an infusible and insoluble granular sulfurized material by reacting a petroleum heavy material and sulfur with stirring in the presence of a reaction medium and further in the presence of, if necessary, an infusible and insoluble solid material, and, further, a process for producing granular carbon comprising carbonizing the granular sulfurized material produced above or alternatively a process for producing granular activated carbon comprising carbonizing and activating the granular sulfurized material.

14 Claims, No Drawings

PROCESS FOR PRODUCING GRANULAR SULFURIZED MATERIAL, GRANULAR CARBON OR GRANULAR ACTIVATED CARBON

BACKGROUND OF THE INVENTION

1. Field of the Invention

The present invention relates to a process for producing an infusible and insoluble granular sulfurized material by reacting a petroleum heavy material and sulfur with stirring in the presence of a reaction medium and further in the presence of, if necessary, an infusible and insoluble solid material. Furthermore, the invention relates to a process for producing granular carbon comprising carbonizing the above described granular sulfurized material and further to a process of producing granular activated carbon comprising and activating the above described granular sulfurized material.

2. Description of the Prior Art

An infusible and insoluble sulfurized material obtained by reacting a heavy hydrocarbon material, such as asphalt and pitch, and sulfur is useful for purposes such as various fillers, reinforcing agents, oil absorbents, and metal collectors and further the sulfurized material has quite excellent properties as an intermediate in the synthesis and manufacture of carbon disulfide, carbon articles, ion exchangers, adsorbents, etc., and further can be expected to have various applications. Therefore, processes for producing such a sulfurized material have been investigated for a long time and some are described in, for example, the specifications of U.S. Pat. Nos. 2,447,004; 2,525,343; 2,539,137; 2,585,454; and 3,248,303 and French Pat. No. 1,479,451. In these known processes, infusible sulfurized materials are produced by adding sulfur to a heavy hydrocarbon such as asphalt, etc., and reacting them by heating. However, in these processes an important disadvantage occurs in that bubbles of hydrogen sulfide generated by the reaction with the sulfur are incorporated in the reaction product to a great extent. That is, when a hydrocarbon such as asphalt is reacted with sulfur, the viscosity of the reaction product increases remarkably as the reaction progresses and the product becomes an infusible and insoluble sulfurized material passing through a rubbery or viscous state. In this reaction course, the bubbles of hydrogen sulfide formed in the reaction are easily broken and released from the reaction system in the early stage of the reaction when the viscosity of the reaction system is comparatively low but as the reaction progresses the viscosity of the reaction system increases making the release of the bubbles difficult and finally only a spongy sulfurized material having a low bulk density and mechanical strength is obtained. Such a disadvantage can be improved to some extent by controlling the rate of temperature rise so that the reaction proceeds slowly but in this case there is the difficulty that a long period of time is required to finish the reaction, which reduces the efficiency greatly.

A second problem is that the infusible sulfurized product agglomerates in the reaction vessel to form lumps. The withdrawal of the lumpy material and granulating the material by crushing or by grinding and molding the lumpy material is quite inefficient and requires a troublesome step, which makes the production process uneconomical. In U.S. Pat. Nos. 2,447,005 and 2,447,006 processes are described to minimize the above described disadvantage by spraying a uniform liquid mixture of a heavy hydrocarbon and sulfur into a heated reaction zone to cause their reaction under heating but these processes are unsuitable from a practical standpoint since they require a complicated apparatus and specific techniques.

A third problem is that the reaction temperature for obtaining the infusible sulfurized material is quite high. U.S. Pat. No. 3,248,303 teaches that it is necessary to heat the reaction system to temperatures higher than 450° C to obtain the infusible product but when the reaction system is heated to such a high temperature, carbonization of the sulfurized material occurs inevitably. The carbonized material may be a useful material as various carbon materials and such is one of the important uses of the product but since the product has other uses than as such a carbonized material, the occurence of carbonization by the high-temperature heating restricts the uses of the sulfurized product.

As described above conventional processes of producing sulfurized materials are accompanied by various difficulties in the properties of the products and the processes themselves and hence development of a new process of producing the sulfurized material unaccompanied by such difficulties has been demanded.

Carbon articles are widely used in various industrial fields such as the general chemical industry, the electrochemical industry, the electric communication industry, the atomic energy industry, etc., as electrically conductive materials, refractory materials, chemically resistant materials, structural materials, lubricants, parts of machinery, etc. These carbon articles are prepared generally by grinding a carbonaceous material, kneading it with a binder such as pitch, a synthetic resin, etc., and molding the mixture into a form meeting the desired purpose. Natural graphite, anthracite, coal, coke, and charcoal have been mainly used as the carbonaceous material for producing the above described carbon articles but it is not always easy to secure a stable supply of these raw materials having high quality.

Therefore, petroleum raw materials which can be supplied in large amounts at a low cost have been evaluated and the petroleum coke industry using these raw materials has become an important industry. A process of producing petroleum coke is generally classified into a delayed coking process as described in Hydrocarbon Processing, 49 (9) 180 (1970). However, the powdery coke obtained by the fluid coking process does not provide high-grade carbon articles and thus is mostly used for fuel. On the other hand, the coke produced by the delayed coking process is quite useful for producing various carbon articles but the process is accompanied by such large disadvantages in that the crushing of the lumpy coke accumulated in a coking drum and withdrawing the coke from the drum is quite difficult, in that the process is unsuitable for continuous running, mechanization, and automation, and in that the running efficiency of the apparatus is quite low. Further the carbonization efficiency is not always satisfactory.

Therefore, a new process of producing carbon materials without the need for handling the lumpy materials which reduces the working efficiency and without forming powdery carbon which has a limited use has been desired. One process which attempts to meet these requirements, is a process in which fusible moldings such as pitch, etc., are converted into infusible moldings by subjecting the moldings to a chemical treatment or a heat treatment in an oxidizng atmosphere and then the infusible materials are subjected to a carbonization treatment. The conversion to an infusible state is attained by treating the fusible material with an oxidizing gas containing $NO_2$, $O_2$, $O_3$, $SO_3$, $Cl_2$, $Br_2$, air, etc., or an oxidizing liquid such as sulfuric acid, phosphoric acid, nitric acid, an aqueous solution of chromic acid, an aqueous solution of potassium permanganate, etc., at a temperature lower than the softening point of the fusible material as disclosed in Japanese Pat. Application OLS No. 31195/1973. However, such a process is accompanied by corrosion of the apparatus due to the use of the oxidizing material or is accompanied by the disadvantage that a long period of time is required for conversion to the desired infusible material.

Thus, from the aforesaid standpoint of difficulties in conventional processes for producing carbon materials, the development of a new process for producing granular carbon has been desired which can be practiced using a raw material available in a large amount at low cost without forming powdery carbon having limited use and further without the necessity for a specific operation for granulating the fusible material.

Furthermore, activated carbon is a most important material as an industrial adsorbent and is used in a large number of fields including not only as adsorbents in the food industry and the chemical industry but also as adsorbents for domestic refrigerators and water purifiers. Also, it has recently become clear that activated carbon is quite effective for the prevention and removal of environmental pollution such as air pollution and water pollution and from this standpoint the development of a technique capable of supplying a large amount of activated carbon having good quality at a low cost has been desired. Hitherto, activated carbon has been produced using wood or coconut shells as the main raw material but a stable supply of a large amount of activated carbon can not be expected from these raw materials. Recently, activated carbon has been produced using coal as the raw material but the type of coal which can provide activated carbon having good quality is obtained from a limited area and thus this technique also involves a large problem in supplying a large amount of good raw materials in a secure and stable manner.

From these points of view, recently attempts have been made to produce activated carbon from a raw material such as a petroleum heavy hydrocarbon which can be supplied in a large amount at a low cost. For example, a process wherein an alkali metal compound such as potassium sulfide, sodium hydroxide, sodium carbonate, and potassium thiocyanate is added to asphalt or pitch followed by carbonization and the carbonized material is activated and a process wherein a reaction product of asphalt or pitch with sulfuric acid or sulfur is carbonized and activated are known. However, in the process in which an alkali metal compound is added, the alkali metal compound must be removed by washing in a subsequent step and thus the process is not practical. Also, in the process in which sulfuric acid or sulfur is used, sulfuric acid or sulfur does not remain in the activated carbon and thus the step of removing such additive is unnecessary. However, in the process in which sulfuric acid is used, the treatment of sulfuric acid is dangerous since the sulfuric acid is present in a large amount and further the corrosion of the apparatus is a problem. On the other hand, in the process in which sulfur is used, although hydrogen sulfide may be formed during the production step, the corrosion of the apparatus is not a particular problem and hydrogen sulfide can be easily regenerated into sulfur by a Clauss reaction or a catalytic decomposition. Thus, the sulfur formed can be repeatedly used, which makes the process economically profitable. The active carbon obtained by the process in which sulfur is used has excellent properties the same as or superior to those of the active carbon obtained from coconut charcoal and the yield of the active carbon is high. In this case, however, unfortunately the sulfurized material is obtained as a sponge-like lumpy product and also the production of the sulfurized material in the form of discrete granules of a desired size having a sufficiently high mechanical strength is difficult as described above.

Also, the process of producing the aforesaid granular carbonaceous solid material is generally classified into a process comprising crushing a lumpy product and a process comprising molding or agglomerating a powdery product into a granular product using a suitable binder. In the former process, it is impossible to produce selectively a granular carbonaceous material having a definite grain size and the yield of grains having a desired grain size is low. Also, the activated carbonaceous material obtained by crushing has the disadvantages that it tends to be damaged during handling due to its irregular and angular form with fine pieces or powders being formed. On the other hand, a granular material obtained by molding is produced generally by mixing a powder of the base material and a binder, molding the mixture into granules, and then subjecting them to a heat treatment. Therefore, due to powder handling, the process has the disadvantages that the working efficiency is low, and as the binding strength between the binder and the grains of powder is weak, the grains in the formed material tend to be reduced to powder by friction. Also, with the molding process it is quite difficult to obtain a fine granular material having a grain size of from a few microns to about 1 mm.

In addition to the above-described processes, a process for producing granular carbon and granular activated carbon in which highly viscous pitch having a high softening point is molded into granules and then the granules are converted into an infusible state is known. However, in this case, although excellent granular carbon having high mechanical strength as compared with conventional products can be obtained since a binder is not used, extremely precise techniques are required for converting a fusible material such as pitch to an infusible state without deforming the material and in particular it is quite difficult to obtain a granular active carbon having grains larger than about 1 mm.

SUMMARY OF THE INVENTION

The present invention meets the above described demands and overcomes the above described difficulties and a feature of this invention is that a petroleum heavy material is reacted with sulfur with stirring in the presence of a reaction medium and further in the presence of, if necessary, an infusible and insoluble solid material or further the infusible and insoluble granular sulfurized material is carbonized or carbonized and activated. That is, a granular sulfurized material, granular carbon, or granular activated carbon having a desired grain size meeting the desired purposes and having excellent mechanical strength can be produced using this invention without the need for granulating by crushing or grinding and molding a lumpy solid material and further without using a specific apparatus for granulation. The terms "infusible" and "insoluble" as used in the description of this invention designate that the granular material is insoluble in the reaction medium and the petroleum heavy material and sulfur which are the materials used in this invention under the sulfurization conditions of the process of this invention and is infusible under the carbonizing conditions, e.g., even if heated to about 400° C to 1200° C it does not thermally fuse, deform, soften or melt.

In the process of this invention granular materials having any desired grain size from a few microns to several centimeters, e.g., about 1 micron to about 2 centimeters, can be obtained by suitably selecting the reaction conditions. The infusible and insoluble sulfurized material obtained by the process of this invention has as one feature a particularly high surface strength and resistance to abrasion as compared with those of the granular sulfurized materials produced by crushing. The granular carbon produced by the process of this invention has as another feature a high reactivity as, in particular, an intermediate in manufacture of other carbon compounds such as carbon tetrachloride and carbon disulfide as compared with conventional materials. Further, the granular, active carbon produced by the process of this invention has as one feature a larger specific surface area than about 2000 m$^2$/g (the specific surface area of commercially available products is usually about 500 to 1000 m$^2$/g) which can be easily obtained.

Furthermore, the form of the granular materials obtained by the process of this invention comprises mainly granular or asymmetric granular materials but depending on the production conditions, disc-like or spindle-like materials can be obtained. In any case the surfaces of the materials are smooth, the granular product is superior in form stability and fluidity and has excellent mechanical strength, such as surface strength. Also, in the process of this invention a dehydrogenation reaction and a polycondensation reaction by sulfur occur to form a sulfurized material of a three-dimensional network structure having high heat resistance and thus the release of low molecular weight hydrocarbons by thermal decomposition is much less in carbonizing the material by heating and consequently the yield of the carbonized product is quite high. Also, in the carbonization the sulfurized material is carbonized as a solid phase without forming a fused state and thus the granular carbon which is reluctant to graphitize can be obtained and thus when the granular carbon is activated, quite excellent activated carbon having a microcrystalline structure can be obtained.

DETAILED DESCRIPTION OF THE INVENTION

The petroleum heavy material used in this invention as the starting material is a material, which is liquid or solid at normal temprature (e.g., about 20° to 30° C), having a softening point of lower than about 400° C, preferably lower than 300° C. a boiling point at normal pressure (e.g., about 1 atmosphere) of higher than about 300° C, preferably higher than 400° C, an H/C atomic ratio of about 0.2 to 1.9 preferably 0.4 to 1.9, and a carbon content of about 80 to 96% by weight. Also, the petroleum heavy material used in this invention is a petroleum heavy residue and such a petroleum heavy material is derived from petroleum refining operations such as distillation, thermal cracking, catalytic cracking, solvent extraction, acid treatment and the like. Examples of these petroleum heavy materials are a heavy residue obtained by distilling crude oil at atmospheric pressure or reduced pressure (e.g., having a boiling point above about 300° C and an H/C atomic ratio of about 1.0 to 1.9); a heavy residue obtained on extracting crude oil, a distillation residue of crude oil at normal pressure, or a distillation residue of crude oil under a reduced pressure with a solvent such as propane, butane, pentane, hexane, cyclohexane or benzene (e.g., having a boiling point above about 350° C, an H/C atomic ratio of about 0.5 to 1.8 and a softening point of about 5 to 300°C); a heavy residue obtained by cracking crude oil, a distillation oil or a residue thereof at normal pressure or a reduced pressure (e.g., having a boiling point above about 300° C and an H/C atomic ratio of about 0.2 to 1.7); and a heavy residue obtained by cracking at an elevated temperature a heavy material obtained on extracting a distillation residue thereof at normal pressure, or a distillation residue thereof at a reduced pressure with a solvent (e.g., having a boiling point above about 300° C and an H/C atomic ratio of about 0.2 to 1.7). Specific examples of petroleum heavy materials which can be used in this invention are various straight asphalts, heavy oils, air-blown asphalt, cut back asphalt, asphalt recovered on solvent deasphalting, catalytic cracking residues of kerosene or light oils, a thermal cracking residue of kerosene or light oils, a naphtha cracking residue, a residue obtained by thermal cracking or hydrocracking a heavy fraction or a residue, etc. Among these materials, the asphalt-series heavy materials are excellent raw materials since they can provide a product which is excellent in infusibility, hardness, and shape in a high yield under comparatively mild conditions. The above described raw materials can be used individually or as a mixture of them. Since these materials are used as the main raw material in this invention, the term "raw material" will be used hereinafter in this specification for simplicity to describe these materials.

The reaction medium used in the process of this invention is a hydrocarbon, which is a liquid at normal temperature, having a boiling pont of from about 50° C to about 400° C, preferably from about 70° C to about 300° C at normal pressure and the reaction medium desirably has a low reactivity with sulfur (to form a polycondensation product) as compared with the raw material employed with sulfur. Suitable reaction media are aliphatic hydrocarbons (e.g., having a boiling point of about 50° to 400° C and an H/C atomic ratio of about 1.9 to 2.3), aromatic hydrocarbons (e.g., having a boiling point of about 80° to 280° C and an H/Catomic ratio of about 1.0 to 1.6), and petroleum fractions (e.g., having a boiling point of about 50° to 400° c and an H/C atomic ratio of about 1.7 to 2.3). Preferred examples of the reaction medium are, for example, aliphatic hydrocarbons such as hexane, octane, and liquid paraffin, and aromatic hydrocarbons such as benzene, toluene, xylene, and tertiary butylbenzene. These materials can be used individually or as a mixture thereof. Furthermore, petroleum fractions having a boiling point ranging from about 50° C to about 400° C at normal pressure obtained by the distillation a crude oil, such as a naphtha fraction, a kerosene fraction, and a light oil fraction are also preferred reaction media in this invention. Highly saturated paraffinic hydrocarbons with an H/C atomic ratio in excess of about 1.8, e.g., aliphatic hydrocarbons and petroleum fractions as described above have a very low reactivity with sulfur. In addition, low boiling point aromatic hydrocarbons (such as benzene, toluene, xylene, tertiarybutylbenzene, etc.) also react very slowly with sulfur as compared with heavy petroleum residues. High boiling naphthenic and aromatic hydrocarbons having a complicated structure which are major components of heavy petroleum residues, and unsaturated olefinic hydrocarbons react readily with sulfur between about 170° to 400° C, and thus the condition of unsaturation of the raw material is an important consideration in choosing the reaction medium employed. In the practice of the process of this invention, the reaction medium used can be recovered for repeated use as the reaction medium.

The main purpose of using the reaction medium in the process of this invention is to reduce the viscosity of the liquid materials in the reaction system for improving the transfer and dispersion of the raw material, sulfur, and the reaction product and, by reducing the viscosity of the liquid materials, the hydrogen sulfide formed can be easily released from the reaction product. Further by stirring the reaction system having a reduced viscosity, the reaction product is dispersed well facilitating the formation of a granular product. Therefore, the reaction medium used in this invention can be one capable of reducing the viscosity of the reaction system and dispersing well the raw material and the reaction product in the reaction system and hence the reaction medium does not necessarily have to dissolve the raw material and sulfur completely therein. Also, in the process of this invention the use of a reaction medium having a high compatibility with the raw material provides the advantage that an infusible and insoluble granular sulfurized material is easily obtained at a comparatively low temperature of from, for example, about 200° C to about 230° C. The reason for this has not as yet been completely clarified but, while not desiring to be bound, it is believed that since the fusible and soluble components dissolve selectively in the reaction medium, the proportion of the fusible and soluble components in the granular sulfurized product are reduced and hence an infusible and insoluble granular sulfurized product can be easily separated.

The amount of the reaction medium used in this invention depends upon the kind of raw material, the kind of reaction medium, the amount of infusible and insoluble solid material if such a material is present, the amount of sulfur, the reaction conditions, etc., but when, for example, a mixture of a material having a high reactivity with sulfur and a material having a comparatively low reactivity with sulfur such as a normal pressure distillation residue of crude oil is used as the raw material, the material having a low reactivity contributes to the reaction medium to promote the dispersion of the reaction product and a granular sulfurized product is obtained without the necessity of adding any other reaction medium and thus, in this case, the normal pressure distillation residue of crude oil can be considered to be a kind of a mixture of a reduced pressure distillation residue of crude oil and a reaction medium. However, when the viscosity of the entire reaction system increases greatly as the reaction with sulfur progresses making it difficult to form a dispersion by stirring as in the case of using asphalt as the raw material, the addition of the reaction medium is necessary. In addition, it is desirable that the reaction medium always be present during the reaction but the reaction medium can be added depending on the viscosity of the reaction product. A suitable viscosity for the reaction system generally is less than about 2,000 CS, preferably less than 400 CS at 98.9° C. That is, the raw material is reacted with sulfur in the absence of a reaction medium or in the presence of a small amount of the reaction medium and when the viscosity of the reaction system increases, the reaction medium can be added. In some cases, such a means is preferred.

As shown in the examples hereinafter, the grain size of the granular sulfurization product formed changes greatly depending on the amount and the kind of the reaction medium and in general as the amount of the reaction medium used increases and as the compatability of the reaction medium with the raw material and sulfur increases, the grain size of the granular sulfurization product formed decreases. Therefore, in order to obtain a sulfurized product having a desired grain size, e.g., about 1 $\mu$ to 2 cm, it is necessary to determine precisely the amount of the reaction medium based on the amounts of the raw material and sulfur, the kind of the reaction medium, and other reaction conditions. For example, in producing a granular sulufurization product from about 1 part by weight of asphalt and about 1.5 parts by weight of sulfur, it is necessary to use at least about 0.5 part by weight of light oil when the light oil is employed as the reaction medium and when more than about 20 parts by weight of light oil is used, the sulfurized product is obtained as quite fine granules. In this case, however, if the amount of light oil as the reaction medium is less than about 0.5 part by weight, the viscosity of the entire reaction system increases greatly. which makes it difficult to disperse the reactants by stirring. Furthermore, when an aromatic hydrocarbon such as toluene is used as the reaction medium, the change of the grain size becomes more marked and thus in order to obtain a granular sulfurized product having a desired grain size, the amount of the reaction medium must be determined quite precisely.

The reaction medium or a liquid composition containing the reaction medium used in the process of this invention can be repeatedly used and a part of the reaction medium may sometimes be consumed as the result of the reaction with sulfur but even in such a case the reaction medium can also be repeatedly used continuously without causing any difficulties by supplementing for the amount of the reaction medium consumed.

The infusible and insoluble solid material used in the process of this invention is a solid carbonaceous material which is insoluble in the raw material, sulfur, and the reaction medium and infusible under the above described reaction conditions and which can be converted into carbon or a gas in a carbonization step or in a heat treatment in the activation step. Preferred examples of infusible and insoluble solid materials are the infusible and insoluble granular sulfurized product, the granular carbon and the granular activated carbon obtained by the practice of the process of this invention or crushed, pulverized, and molded materials of these materials. Furthermore, petroleum coke, coal, coke, and charcoal can be used as infusible and insoluble solid materials. If desired an inorganic compound such as a metal oxide, e.g., calcium oxide, aluminium oxide, iron oxide, etc., can be added to the infusible and insoluble solid material. The infusible and insoluble solid materials can be used individually or as a mixture thereof.

The reason for using the infusible and insoluble solid material in this invention is that the granulation in the production step for granular sulfurization is facilitated and a granular sulfurized material having a desired grain size is produced at high efficiency. Also, as will be understood from the examples and comparison examples hereinafter, the addition of the infusible and insoluble solid material to the reaction system prevents quite well the adhesion of the reaction intermediate to parts of the reaction vessel such as the wall of the vessel, the stirrer, baffle plates, etc., and the aggregation of the reaction product, as well as narrows the grain size distribution of the granular sulfurized product obtained and increases the yield of the granular product having a desired grain size range. The mechanism on how such effects are obtained by the addition of the infusible and insoluble solid material has not yet been completely clarified but it is believed that the infusible and insoluble solid material acts as cores for the formation of the granular product while the solid material moves through the reaction medium by stirring or the reaction intermediate is incorporated in layers of the infusible and insoluble solid materials and further the solid material abrades off the reaction intermediate attached to the inside wall, etc., of the reaction vessel.

Another reason for using the infusible and insoluble solid material is that for the granular products obtained by the process of this invention, granular products having grain sizes other than the desired one are partially or completely returned in the reaction system as the infusible and insoluble solid material with or without being crushed for growing to a suitable grain size to produce ultimately only a granular product having a desired grain size distrubition.

There is no particular limitation with respect to the size of the infusible and insoluble solid material used in this invention and the size of the infusible and insoluble solid material can be larger or smaller than the grain size of the desired granular product. However, in general, since the effect of the infusible and insoluble solid material is more marked as the grain size of the material present in the reaction system decreases, a granular or powdery infusible and insoluble solid material having a grain size of less than about 10 mm, preferably of from 0.01 mm to 5 mm, is usually used, In the process of this invention, however, the desired granular sulfurized product, the desired granular carbon formed by carbonizing the granular sulfurized product, or the desired granular activated carbon formed by carbonizing and activating the granular sulfurized product can be obtained without adding the aforesaid infusible and insoluble solid material.

When the infusible and insoluble solid material is used, it is preferred that the amount of the infusible and insoluble solid material be about 0.02 to 2 parts by weight per part by weight of the total amount of the raw material and the reaction medium.

In the practice of the process of this invention, since the amount of sulfur used depends upon the reactivity of the raw material, the kind of reaction medium, the reaction conditions, etc., and, further as is shown in the examples since the grain size of the granular sulfurized product differs markedly according to the amount of the sulfur used even if factors contributing to the reaction, such as the raw material, etc., are the same, the amount of sulfur used must be precisely selected in order to obtain a granular sulfurized product having the desired grain size. Generally speaking, preferably about 0.2 to 5 parts by weight of sulfur per part by weight of the raw material and more preferably 0.3 to 3 parts by weight of sulfur, are used. The amount of the reaction medium employed will vary with the kind of raw materials and reaction medium. The amount of the reaction medium is generally not more than about 20 parts by weight, preferably not more 7 parts by weight, based on the weight of the raw materials from the standpoint of economics. The effect of the amount of sulfur added is as follows: That is, in general, when the amount of sulfur is low, the grain size of the product decreases and when the amount of sulfur used is less than about 0.2 part by weight per part by weight of the raw material, infusibilization tends to become insufficient. Sulfur can be added all at once or can be added incrementally or continuously and in the latter case the grain size of the granular sulfurized product formed differs greatly depending on the rate and the period of time for adding the sulfur. The sulfur used in the process of this invention is elemental sulfur which can be a solid or molten. The sulfur can be added to the reaction system before heating the reaction system or it can be added all at once or gradually to the reaction system after the temperature of the reaction system has reached the reaction temperature.

In the process of this invention the reaction of the raw material with the sulfur proceeds easily and an infusible and insoluble sulfurized product is obtained in a short period of time. By adding a catalyst, e.g., a Lewis acid, for example, a metal halide such as aluminum chloride, zinc chloride, ferric chloride, etc., in an amount of about 0.01 to 0.5 part by weight, preferably 0.03 to 0.3 part by weight, per part by weight of sulfur, it becomes possible to increase the rate of reaction and to reduce the reaction temperature further.

The term "stirring" as used in this specification means that the materials in the reaction vessel are maintained in a fluid state and the materials in the reaction system are uniformly dispersed using physical means and the chemical reaction is promoted uniformly by improving mass transfer and heat transfer in the reaction system. Therefore, there is no particular limitation with respect to the stirring method and any stirring means and operation having various structures suitable for attaining the above described objects can be used. For example, a shaking system, a stirring vane rotation system, a stirring vane shaking system, a liquid flow system, a gas jet system, a liquid shaking system, etc., can be employed for the purpose. Also, for improving the effect of the stirring, it is effective to disperse foreign materials, e.g., liquid drops which are not compatible with the reactants, such as water drops, or solid particles such as ceramic balls, in the reaction system forming a violent liquid turbulence around them or it is sometimes effective as a modification of the above described effective means to carry out the reaction while the raw material, sulfur and the reaction medium are dispersed in a foreign liquid material having a low viscosity, such as water. When the reaction system is not stirred, a lumpy sulfurized product accumulates in the reaction vessel and a granular sulfurized product is not obtained.

The reaction of this invention can be carried out as a batch system or a continuous system. For example, the reaction can be easily carried out continuously by employing a multistage type stirring bath.

In the process of this invention, the reaction temperature suitable for producing the granular sulfurized product by the reaction of the raw material and sulfur ranges from about 170° C to about 400° C, preferably from about 200° C to about 300° C. The reaction period of time can be reduced by increasing the reaction temperature but if the temperature is higher than about 400° C, there are the disadvantages that the loss of the reaction medium becomes larger and a lumpy sulfurized material other than the desired granular sulfurized product is produced as a by-product and accumulates on the inside walls of the reaction vessel. This results in making the smooth operation of the reaction difficult. At a reaction temperature of higher than about 200° C, the granular sulfurized product forms in quite a short period of time. In this case, when the reaction period of time is short, a granular sulfurized product having a low density is obtained but in such a case, by further continuing the reaction, the strength and the density of the granular sulfurized product can be increased. Moreover, it is not always necessary to rect completely the raw material and sulfur or on the contrary since a large amount of sulfur is required and also the reaction period of time increases in order to conduct the reaction completely, it is desired to leave unreacted materials and recycle these unreacted materials to the reaction system for reuse.

In the process of this invention, the reaction is carried out in a liquid phase. The reaction can preferably be carried out under substantially atmospheric pressure. However, super atmospheric pressure sufficient to supress any tendency toward volatilization of the reaction medium at operation temperatures can be employed when the boiling point of the reaction medium is lower than the operation temperature employed.

The reaction can also be carried out under a pressure of from atmospheric pressure to about 100 kg/cm$^2$, preferably from normal pressure to about 30 kg/cm$^2$.

The granular sulfurized product obtained by the process of this invention does not exhibit a softening point and hence the product retains its granular form in the subsequent carbonization treatment at a high temperature. The carbonization is easily practiced by heating the granular sulfurized product to temperatures ranging from about 400° C to about 12000° C, preferably from 450° C to about 1100° C, in an inert gas atmosphere such as nitrogen, hydrogen sulfide, carbon monoxide or a mixture thereof.

The granular carbon obtained by the process of this invention can be easily converted into granulr activated carbon by activating the granular carbon in any conventional manner using an oxidizing atmosphere. Alternatively, granular activated carbon can be obtained by heating the granular sulfurized product to a temperature of about 700° C to 1100° C directly in a mild oxidizing atmosphere, such as steam or flue gas, whereby the product is carbonized and activated simultaneously. Activation using carbon dioxide, an oxygen-containing gas, etc., can also be employed in this invention. Of these activation methods, steam activation is preferred. Steam is preferably used as an oxidizing gas. Carbon dioxide or flue gases containing about 1 to 30% oxygen can also be used with or without steam.

Furthermore, the granular sulfurized product or the granular carbon produced by the process of this invention can of course be crushed to a desired particle size and then carbonized or activated, or can be pulverized, formed into pellets using a suitble binder before carbonization or activation.

The material of the rection vessel used in the practice of the process of this invention can be one inactive to the reaction materials under the reaction condition and for example, stainless steel, titanium, enameled ironware, etc., can be suitably used as the material for the reaction vessel.

The invention will be described more specifically by reference to the following examples and comparison examples but it is to be understood that they are included merely for purpose of illustration and are not intended to be construed as limiting the scope of this invention. All parts, percentages, ratios, etc., in these examples are by weight unless otherwise indicated.

EXAMPLE 1

In a one-liter stainless steel reaction vessel equipped with an electromagnetic rotary type stirrer and a reflux condenser were placed 200 g of a light oil (herein after designated "light oil", having a boiling point of 185° to 250° C; a viscosity of 2.14 CS at 50° C; an H/C atomic ratio of 1.9; a specific gravity (15/4° C) of 0.835), 100 g of asphalt obtained on deasphalting a normal-pressure distillation residue using propane (hereinafter designated "propane deasphalting asphalt" having a penetration at 25° C of 18 according to JIS K 2530; n-pentane insoluble components of 21 wt%; a sulfur content of 5.7 wt%; and H/C atomic ratio of 1.41), and 150 g of sulfur and these materials were reacted for 4 hours at 230° to 235° C under normal pressure with stirring at a rate of 900 r.p.m. During the reaction, a large amount of a gas mainly composed of hydrogen sulfide formed. After the reaction was over, the reaction mixture was withdrawn nd subjected to a centrifugal filtration to provide 136 g of a granular sulfurized product of disc-like grains of a length of 1 to 18 mm, a width of 1 to 7 mm, and a thickness of 1 to 3 mm, a small amount of a lumpy sulfurized material, and 145 g of an oily material mainly composed of the reaction medium. The sulfur content of the granular sulfurized product was 26% by weight and when the product was rapidly heated to 400° to 1200° C, the product did not melt.

In addition, the lumpy sulfurized material was a solid material attached to the bottom and the wall of the reaction vessel and further the oily material was a liquid material at normal temperature containing the light oil, the unreacted asphalt, etc.

COMPARISON EXAMPLE 1

In the same reaction vessel as described in Example 1 were charged the same amounts of the light oil, the propane deasphalting asphalt and sulfur as in Example 1 and these materials were reacted for 4 hours at 230° to 235° C under normal pressure without stirring the system. After the reaction was over, the reaction mixture was withdrawn and it was found that 220 g of an infusible and insoluble lumpy sulfurized material was formed with no granular sulfurized material being formed.

EXAMPLE 2

When the same procedure as described in Example 1 was followed while the stirring rate was changed to 1200 r.p.m., 151 g of a granular sulfurized product of disc-like grains smaller than that of the product obtained in Example 1 (a length of 1 to 17 mm, a width of 1 to 4 mm, and a thickness of 1 to 3 mm) was obtained and 119 g of an oily material was recovered. In this case, there was less formation of a lumpy product.

EXAMPLE 3

In the same reaction vessel as described in Example 1 were charged 400 g of the light oil, 200 g of the propane deasphalting asphalt, and 300 g of sulfur and these materials were reacted for 4 hours at 230° to 235° C under normal pressure with stirring at a rate of 1200 r.p.m. After the reaction was over, the reaction mixture was withdrawn from the vessel. Thus, a granular sulfurized product of slender spindle-like grains of a length of 1 to 5 mm, and a diameter of 0.4 to 2 mm obtained in an amount of 321 g.

EXAMPLE 4

In the same reaction vessel as described in Example 1 were charged 400 g of the light oil, 200 g of the propane deasphalting asphalt, and 250 g of sulfur and these materials were reacted for 4 hours at 230° to 235° C at normal pressure with stirring at a rate of 1200 r.p.m. to provide 317 g of a spherical granular product having a mean grain size of about 9.7 mm. Less formation of a lumpy product was observed.

EXAMPLE 5

In the same reaction vessel as described in Example 1 were charged 400 g of the light oil, 200 g of the propane deasphalting asphalt, and 200 g of sulfur and these materials were reacted for 4 hours at 230° to 235° C under normal pressure with stirring at a rate of 1200 r.p.m. to provide 268 g of a spherical granular product having a mean grain size of about 0.03 mm.

EXAMPLE 6

In the same reaction vessel as described in Example 1 were charged 400 g of the light oil, 100 g of the propane deasphalting asphalt, and 150 g of sulfur and then these materials were reacted for 4 hours at 230° to 235° C under normal pressure with stirring at a rate of 1200 r.p.m. to provide 263 g of a spherical granular sulfurized product having a means grain size of about 0.2 mm. In this case, less formation of a lumpy material was observed.

COMPARISON EXAMPLE 2

In the same reaction vessel as described in Example 1 were charged 100 g of the propane deasphalting asphalt and 150 g of sulfur and the reaction was carried out at 230° to 235° C under normal pressure with stirring at a rate of 1200 r.p.m. As the reaction progressed, the viscosity of the materials in the reaction vessel increased greatly and 20 minutes after the start of the reaction, the stirring of the system became impossible. When the reaction was continued in situ for 4 hours, 208 g of a lumpy sulfurized material was obtained and a granular sulfurized product was not obtained. The product was a pumice-like solid material at ambient temperature and when the material was heated rapidly to 400° C, the product melted partially.

EXAMPLE 7

In the same reaction vessel as described in Example 1 were charged 400 g of the light oil, 200 g of a Kuwait reduced-pressure residual oil (having a specific gravity (15/4° C) of 1.03, n-heptane insoluble components of 5.6 wt%; a sulfur content of 5.6 wt%) and 300 g of sulfur and these materials were reacted for 4 hours at 230° to 235° C under normal pressure with stirring at a rate of 900 r.p.m. to provide 121 g of a granular sulfurized product of disc-like grains of a length of 10 to 15 mm, a width of 4 to 8 mm, and a thickness of 1.5 to 3 mm.

EXAMPLE 8

In the same reaction vessel as described in Example 1 were charged 400 g of a Kuwait normal-pressure residual oil (having a specific gravity (15/4° C) of 0.966; n-heptane insoluble components of 2.6 wt%; a sulfur content of 4.1 wt%) and 200 g of sulfur and these materials were reacted for 3 hours at 240° to 245° C under normal pressure with stirring at a rate of 900 r.p.m. to provide 194 g of a granular product of disc-like grains of a length of 5 to 10 mm, a width of 3 to 5 mm, and a thickness of 1 to 3 mm.

EXAMPLE 9

In the same reaction vessel as described in Example 1 were charged 400 g of liquid paraffin (IBP of 280° C), 200 g of the propane deasphalting asphalt, and 300 g of sulfur and these materials were reacted for 4 hours at 230° to 245° C under normal pressure with stirring at a rate of 1000 r.p.m. to provide 110 g of a granular sulfurized product of disc-like grains of a length of 7 to 13 mm, a width of 3 to 6 mm, and a thickness of 1 to 4 mm.

EXAMPLE 10

In the same reaction vessel as described in Example 1 were charged 200 g of FCC-cycle oil having a boiling point of 330° to 420° C, 200 g of the propane deasphalting asphalt, and 300 g of sulfur and then these materials were reacted for 4 hours at 230° to 235° C under normal pressure with stirring at a rate of 500 r.p.m. to provide 260 g of a spherical granular sulfurized product having a mean grain size of 1.5 mm.

EXAMPLE 11

In the same reaction vessel as described in Example 1 were charged 300 g of tertiary-butylbenzene, 200 g of the propane deasphalting asphalt as in Example 1, and 300 g of sulfur and these materials were reacted for 4 hours at 230° to 235° C under a pressure of 15 kg/cm² with stirring at a rate of 700 r.p.m. to provide 120 g of a spherical granular sulfurized product having a mean grain size of 0.6 mm.

EXAMPLE 12

In the same reaction vessel as described in Example 1 were charged 145 g of the oily material recovered in Example 1, 70 g of the light oil, 65 g of the propane deasphalting asphalt, and 150 g of sulfur and these materials were reacted for 4 hours at 230° to 235° C under normal pressure with stirring at a rate of 900 r.p.m. to provide 129 g of a granular product of disc-like grains of a length of 6 to 15 mm, a width of 3 to 9 mm, and a thickness of 1 to 4 mm.

EXAMPLE 13

In the same reaction vessel as described in Example 1 were charged 400 g of the light oil and 200 g of the propane deasphalting asphalt and after heating the reaction system to 230° to 235° C, 300 g of sulfur was added thereto gradually under normal pressure at a rate of one gram per minute with stirring at a rate of 500 r.p.m. Thereafter, the reaction was further continued for one hour and then the reaction mixture was subjected to a centrifugal filtration to provide 428 g of a spherical granular sulfurized product having a mean grain size of 0.005 mm.

EXAMPLE 14

In the same reaction vessel as described in Example 1 were charged 400 g of the light oil and 300 g of sulfur and after heating the mixture to 230° to 235° C under normal pressure, 200 g of the propane deasphalting asphalt was added to the mixture gradually at a rate of one gram per minute. When the reaction was further continued for one hour, 416 g of a spherical granular sulfurized product having a mean grain size of 0.8 mm was obtained.

EXAMPLES 15 to 18

When each of the granular sulfurized products obtained in Examples 1, 3, 10, and 13 was heated to 450° C, each product was carbonized while generating a gas, mainly hydrogen sulfide, etc., and granular carbon was obtained in an amount of 55% by weight (Example 15), 64% by weight (Example 16), 75% by weight (Example 17) and 52% by weight (Example 18) to the granular sulfurized products, respectively.

EXAMPLE 19

The granular carbon of disc-like grains obtained in Example 15 was crushed into fine grains of a diameter of 1.0 to 1.4 mm and 50 g of such grains were activated using steam for 70 minutes at 850° C to provide 21 g of granular activated carbon having a specific surface area of 2250 m²/g and a Methylene Blue adsorption of 525 mg/g. The sulfur content of the activated carbon was 1.2% by weight.

In addition, the specific surface area is a value measured by the B.E.T. method which is a surface area measurement method using the absorption of nitrogen and the Methylene Blue adsorption value is measured using a buffer solution (adjusted to a pH of 7) containing 300 mg/liter of Methylene Blue. The buffer solution as described above and the fine grains of the resulting activated carbon were weighed in desired amounts and charged into a flask for shaking. The above materials were vigorously shaken for 30 minutes and the activated carbon was then filtered out. The amount of Methylene Blue in the filtrate which remained was determined from the adsorbance using a light having a wavelength of 665 m$\mu$. The value thus calculated is the adsorption value per unit weight of the activated carbon. These values in the following examples were also measured by the same methods as above.

EXAMPLE 20

From the granular carbon of spindle-like grains obtained in Example 16, a granular carbon having a length of 1 to 1.4 mm and a diameter of 0.4 to 1 mm was selected and was activated by steam for 60 minutes at 850° C without being crushed to provide 22 g of an activated carbon having a specific surface area of 1820 m²/g and a Methylene Blue adsorption of 336 mg/g.

EXAMPLE 21

When 50 g of the granular carbon of spherical grains obtained in Example 17 was activated by steam for 70 minutes at 850° C, 23 g of a granular activated carbon having a specific surface area of 2178 m²/g and a Methylene Blue adsorption of 513 mg/g was obtained.

EXAMPLE 22

When 50 g of the spherical granular carbon obtained in Example 18 was activated by steam for 40 minutes at 850° C, 23 g of a spherical granular activated carbon having a specific surface area of 1820 m²/g and a Methylene Blue adsorption of 360 mg/g was obtained.

EXAMPLE 23 to 28

Each of the crushed activated carbon obtained in Example 19, the granular activated carbons obtained in Examples 20, 21, and 22, a commercially available crushed activated carbon (having a diameter of 1.0 to 1.1 mm, a specific surface area of 970 m²/g, and a Methylene Blue absorption of 185 mg/g), and a commercially available spherical molded type activated carbon (having a diameter of 1.0 to 1.5 mm, a specific surface area of 970 m²/g, and a Methylene Blue adsorption of 170 mg/g) was placed in a glass tube of an inside diameter of 20 mm and a length of 200 mm and the glass tube was rotated for 10 hours at a rate of 10 r.p.m. Then, the weight of the powder of a size less than 0.07 mm was measured and the percentage of the powder to the total material was determined. The powdered percentages of these activated carbons were 0.1% by weight, less than 0.01% by weight, less than 0.01% by weight, less than 0.01% by weight, 0.3% by weight, and 2.8% by weight respectively, which showed that the activated carbons obtained by the process of this invention formed a powder with greater difficulty as compared with the commercially available activated carbons.

EXAMPLES 29 to 32

In the same reaction vessel as described in Example 1 were charged 150 g of the propane deasphalting asphalt, 225 g of sulfur, and 75 g of the granular sulfurized product of a grain size of 0.5 to 1.0 mm obtained by the process of this invention and then after adding to each of them 150 g of the light oil (Example 29), 300 g of the light oil (Example 30), 450 g of this light oil (Example 31), and 600 g of the light oil (Example 32), these materials were reacted in each case for 4 hours at 230° to 235° C under normal pressure with stirring at a rate of 900 r.p.m. During the reaction, a large amount of a gas mainly composed of hydrogen sulfide was formed. Then, the reaction mixture was withdrawn from the reaction vessel and subjected to a centrifugal filtration to provide an infusible and insoluble spherical granular sulfurized product having the grain size distribution as shown in Table 1. Less reaction product attached to the wall of the reaction vessel in a lumpy form was observed.

COMPARISON EXAMPLE 3

In the same reaction vessel as described in Example 1 were charged 150 g of the propane deasphalting asphalt, 225 g of sulfur, and the granular sulfurized product of a diameter of 0.5 to 1.0 mm obtained by the process of this invention and then the reaction was carried out at 230° to 235° C with stirring at a rate of 900 r.p.m. As the reaction progressed, the viscosity of the materials in the reaction system increased greatly and about 20 minutes after the temperature of the reaction system reached the reaction temperature. it became impossible to stir the system. When the reaction was continued in situ for 4 hours, a granular sulfurized product was not obtained and only a lumpy sulfurized product formed. When cooled, the product was converted into a pumice-like solid material. When the material was heated rapidly to 400° C, the product partially melted.

Table 1

| Grain Size Distribution* (mm) | Ex. 29 | Ex. 30 | Ex. 31 | Ex. 32 | Comparison Example 3 |
|---|---|---|---|---|---|
| <0.10 | 4 | 5 | 8 | 3 | 0 |
| 0.10–0.15 | 4 | 5 | 8 | 6 | 0 |
| 0.15–0.25 | 4 | 5 | 8 | 83 | 0 |
| 0.25–0.50 | 1 | 0 | 0 | 8 | 0 |
| 0.5–1.0 | 3 | 0.2 | 1 | 0 | 0 |
| 1.0–1.4 | 43 | 0.4 | 4 | 0 | 0 |
| 1.4–2.3 | 48 | 55 | 73 | 0 | 0 |
| 2.3–5.0 | 1 | 39 | 14 | 0 | 0 |
| 5.0–10 | 0 | 0 | 0 | 0 | 0 |
| 10–15 | 0 | 0 | 0 | 0 | 0 |
| >15 | 0 | 0 | 0 | 0 | 0 |
| Lumpy Sulfurized Product** | 0 | 0 | 0 | 0 | 100 |

*Weight percent (the added granular sulfurized product was removed).
**The lumpy sulfurized product attached to the wall of the reaction vessel, etc.

As is clear from the results shown in Table 1, the grain size of the granular sulfurized product formed was changed depending on the amount of the reaction medium used and in Comparison Example 3 in which no reaction medium was used, a granular product was not produced.

EXAMPLES 33 to 37

In the same reaction vessel as described in Example 1 were charged 200 g of the propane deasphalting asphalt, 400 g of the light oil, and 100 g of the granular sulfurized product of a grain size of 0.5 to 1 mm produced by the process of this invention and then after adding to the mixture 200 g (Example 33), 250 g (Example 34), 275 g (Example 35), 300 g (Example 36), or 400 g (Example 37) of sulfur, the reaction was carried out for 4 hours at 230° to 235° C under normal pressure while stirring at a rate of 900 r.p.m. to provide, in each case, an infusible and insoluble granular sulfurized product having the grain size distribution as shown in Table 2.

Table 2

| Grain Size Distribution* (mm) | Ex. 33 | Ex. 34 | Ex. 35 | Ex. 36 | Ex. 37 |
|---|---|---|---|---|---|
| <0.02 | 10 | 7 | 6 | 4 | 4 |
| 0.02–0.05 | 64 | 7 | 6 | 4 | 4 |
| 0.05–0.10 | 25 | 7 | 6 | 4 | 4 |
| 0.10–0.25 | 0.1 | 7 | 6 | 4 | 4 |
| 0.25–0.5 | 0.7 | 11 | 1 | 0 | 0 |
| 0.5–1.0 | 0.7 | 48 | 12 | 0 | 0.4 |
| 1.0–1.4 | 0.7 | 26 | 56 | 55 | 12 |
| 1.4–2.3 | 0 | 7 | 22 | 24 | 37 |
| 2.3–5.0 | 0 | 1.3 | 2 | 17 | 44 |
| >5.0 | 0 | 0 | 0 | 0 | 3 |

*The added granular sulfurized product was removed (weight percent).

EXAMPLES 38 to 40

In the same reaction vessel as described in Example 1 were charged 200 g of the propane deasphalting asphalt, 400 g of the light oil, and 300 g of sulfur and after adding 20 g (Example 38), 60 g (Example 39), or 100 g (Example 40) of the crushed granular sulfurized product obtained by the process of this invention (the grain size distribution of the crushed product was 30% by weight of grains having a size less than 0.25 mm, 30% by weight of grains having a size of 0.25 to 0.5 mm, and 40% by weight of grains having a size of 0.1 to 1.0 mm), the reaction was carried out for 4 hours at 230° to 235° C with stirring at a rate of 900 r.p.m. to provide an infusible and insoluble spherical granular sulfurized product having the grain size distribution as shown in Table 3. In addition, for the purpose of comparison, the result obtained in Example 1 in which the crushed granular sulfurized product was not added is also shown in Table 3.

Table 3

| Grain Size Distribution* (mm) | Example 38 | Example 39 | Example 40 | Example 1 |
|---|---|---|---|---|
| <0.5 | 5 | 3 | 3 | 5 |
| 0.5–1.0 | 0 | 0 | 1 | 0 |
| 1.0–1.4 | 0 | 6 | 29 | 0 |
| 1.4–2.3 | 0 | 65 | 60 | 2 |
| 2.3–5.0 | 23 | 26 | 7 | 31 |
| 5.0–10.0 | 61 | 0 | 0 | 34 |
| 10.0–15.0 | 7 | 0 | 0 | 11 |
| >15.0 | 2 | 0 | 0 | 14 |
| Lumpy Sulfurized Product** | 2 | 0 | 0 | 5 |
| Granular Product Shape | Disc | Sphere | Sphere | Disc |

*Weight percent to the total solid materials formed by the reaction (including the added solid material).
**The lumpy material attached to the wall of the reaction vessel, etc.

As is clear from the results shown in Table 3, in Examples 38 to 40, granular products having a narrow grain size distribution were obtained and either no lumpy material or a low amount of lumpy material was attached to the wall of the reaction vessel. Also, it is clear that by the amount of the crushed granular sulfurized product added, the grain size and the shape of the product changed.

EXAMPLES 41 to 43

In the same reaction vessel as described in Example 1 were charged 200 g of the propane deasphalting asphalt, 400 g of the light oil, 300 g of sulfur, and 100 g of the granular sulfurized product obtained by the process of this invention and then the reaction was carried out for 4 hours at 230° to 235° C with stirring at a rate of 900 r.p.m.

In addition, the grain size of the granular sulfurized product used above was less than 0.25 mm (Example 41), 0.25 to 0.5 mm (Example 42), or 2.8 to 5.0 mm (Example 43). The grain size distributions and the shapes of the granular products obtained by the reaction are shown in Table 4.

Table 4

| Grain Size Distribution* (mm) | Example 41 | Example 42 | Example 43 |
|---|---|---|---|
| <0.5 | 6 | 4 | 5 |
| 0.5–1.0 | 84 | 94 | 0 |
| 1.0–1.4 | 4 | 2 | 0 |
| 1.4–2.3 | 6 | 0 | 0 |
| 2.3–5.0 | 0 | 0 | 46 |
| 5.0–10.0 | 0 | 0 | 49 |
| >10.0 | 0 | 0 | 0 |
| Granular Product Shape | Sphere | Sphere | Disc |

*Weight percent to the total solid materials formed by the reaction (including the added solid material).

EXAMPLE 44

In the same reaction vessel as described in Example 1 were charged 400 g of the light oil, 200 g of the propane deasphalting asphalt, 300 g of sulfur, and 100 g of Pacific Ocean coal (an ash content of 13%; a volatiles content of 52%; and H/C atomic ratio of 0.94) which was crushed into grains of a size of 0.4 to 1.0 mm and then the reaction was carried out for 4 hours at 230° to 235° C under normal pressure with stirring at a rate of 900 r.p.m. to provide a granular sulfurized product having a mean grain size of about 2.5 mm.

EXAMPLE 45

In the same reaction vessel as described in Example 1 were charged 400 g of the light oil, 100 g of the propane deasphalting asphalt, and 150 g of sulfur and the reaction was carried out for 2 hours at 230° to 235° C with stirring at a rate of 900 r.p.m. to provide a granular sulfurized product having a mean grain size of about 0.2 mm. When 200 g of the propane deasphalting asphalt and 250 g of sulfur where further added to the reaction mixture and the reaction was carried out for 4 hours, a granular sulfurized product having a mean grain size of about 0.8 mm was obtained.

EXAMPLE 46

In the same reaction vessel as in Example 1 were charged 200 g of Kuwait reduced-pressure residual oil as described in Example 7, 400 g of the light oil, 250 g of sulfur, and 100 g of the granular sulfurized product obtained by the process of this invention, which was crushed into grains of a size less than 0.25 mm and then the reaction was carried out for 4 hours at 230° to 235° C with stirring at a rate of 1200 r.p.m. to provide a granular sulfurized product of a spindle-like grains having a length of about 1 to 2 mm and a diameter of about 0.4 to 1 mm.

EXAMPLE 47

In the same reaction vessel as in Example 1 were charged 400 g of the Kuwait normal-pressure residual oil same as prescribed in Example 8, 300 g of sulfur and 100 g of the granular sulfurized producing having a grain size of 0.5 to 1.0 mm obtained by the process of this invention and the reaction was carried out for 4 hours at 230° to 235° C with stirring at a rate of 900 r.p.m. to provide a spherical granular sulfurized product having a mean grain size of about 0.5 mm.

Example 48

In the same reaction vessel as describe in Example 1 were charged 200 g of the propane deasphalting asphalt, 300 g of tertiary-butylbenzene, 300 g of sulfur, and 100 g of the granular sulfurized product having a grain size of 0.5 to 1.0 mm obtained by the process of this invention and the reaction was carried out at 230° to 235° C under a pressure of 15 kg/m$^2$ with stirring at a rate of 500 r.p.m. to provide a spherical granular sulfurized product having a mean grain size of about 0.2 mm.

EXAMPLE 49

In the same reaction vessel as described in Example 1 were charged 400 g of the light oil, 300 g of sulfur, and 100 g of the granular sulfurized product having a grain size of 0.5 to 1.0 mm obtained by the process of this invention and then after heating the mixture to 230° to 235° C under normal pressure, 200 g of the propane deasphalting asphalt was added gradually at a rate of one gram per minute with stirring at a rate of 500 r.p.m. Then, when the reaction was carried out for one hour, a spherical granular sulfurized product having a mean grain size of about 0.7 mm was obtained.

EXAMPLE 50

In the same reaction vessel as described in Example 1 were charged 400 g of the light oil, 200 g of the propane deasphalting asphalt, and 100 g of the granular sulfurized product having a grain size of 0.5 to 1.0 mm obtained by the process of this invention and then 300 g of sulfur was added to the mixture gradually at a rate of one gram per minute at temperatures of 230° to 235° C under normal pressure with stirring at a rate of 900 r.p.m. Thereafter, the reaction continued for one hour and then the reaction mixture was withdrawn from the reaction vessel to provide a spherical granular sulfurized product having a mean grain size of about 0.005 mm.

EXAMPLE 51

When the granular sulfurized product having a grain size of 1.0 to 1.4 mm obtained in Example 29 was carbonized by heating to 450° C for 2 hours in a nitrogen gas atmosphere, the granular carbon shown in Table 5 was obtained.

EXAMPLE 52

When the granular sulfurized product having a grain size of 0.15 to 0.25 mm obtained in Example 32 was treated as in Example 51, the granular carbon shown in Table 5 was obtained.

EXAMPLE 53

When the granular sulfurized product having a grain size of 0.5 to 1.0 mm obtained in Example 34 was treated as in Example 51, the granular carbon shown in Table 5 was obtained.

EXAMPLE 54

When the granular sulfurized product obtained in Example 42 was treated as in Example 51, the granular carbon shown in Table 5 was obtained.

COMPARISON EXAMPLE 4

A mixture of charcoal powder passed through a sieve of a mesh size of 0.05 mm and coal tar pitch as a binder was molded into spherical grains using a rotary granulator in an ordinary manner and heated to 450° C for 2 hours in a nitrogen gas atmosphere to provide the granular carbon shown in Table 5.

Table 5

|  | Ex. 51 | Ex. 52 | Ex. 53 | Ex. 54 | Comparison Ex. 4 |
|---|---|---|---|---|---|
| Mean Grain Size (mm) | 1.2 | 0.18 | 0.7 | 0.8 | 1.2 |
| Powdered Percentage* (by weight) | <0.01 | <0.01 | <0.01 | 0.04 | 2.0 |

*The sample was placed in a glass tube of an inside diameter of 20 mm and a length of 200 mm in an amount of 20 ml and the glass tube was rotated for 10 hours at a rate of 10 r.p.m. The weight of the powder of a size less than 0.07 mm thus formed was measured and the percentage of the powder to the total material is shown.

As is clear from the results shown in Table 5, the granular carbons obtained by the process of this invention exhibited a very low powdered percentage and thus it can be easily understood that the granular carbons produced by the process of this invention were excellent in mechanical strength.

EXAMPLE 55

When the granular carbon obtained in Example 51 was activated by steam for 90 minutes at 850° C using a fluidized activation furnace in an ordinary manner, the granular active carbon shown in Table 6 was obtained.

EXAMPLE 56

When the granular carbon obtained in Example 53 was activated by steam for 60 minutes at 850° C using a fluidized activation furnace, the granular activated carbon shown in Table 6 was obtained.

EXAMPLE 57

The granular carbon obtained in Example 54 was treated as in Example 55 to provide the granular activated carbon shown in Table 6.

Table 6

|  | Ex. 55 | Ex. 56 | Ex. 57 | Comparison Sample 1 | Comparison Sample 2 |
|---|---|---|---|---|---|
| Mean Grain Size (mm) | 1.2 | 0.7 | 0.8 | 1.0 | 1.2 |
| Specific Surface Area* (m²/g) | 1560 | 1820 | 2230 | 970 | 700 |
| Methylene Blue Adsorption** (mg/g) | 360 | 425 | 540 | 185 | 150 |
| Powdered Percentage (by weight) | <0.01 | <0.01 | 0.05 | 0.3 | 2.3 |

*Value measured by a B.E.T. method using nitrogen absorption
**Measured using a buffer solution (pH 7) containing 300 mg/liter of Methylene Blue.

Comparison Sample 1 was a commercially available crushed activated carbon and Comparison Sample 2 was a commercially available spherical activated carbon.

As is clear from the results shown in Table 6, the granular activated carbons obtained by the process of this invention were superior in surface area and Methylene Blue adsorption to commercially available articles and further were very excellent in powdered percentages or mechanical strength.

EXAMPLE 58

In the same reaction vessel as described in Example 1 were charged 200 g of the propane deasphalting asphalt, 400 g of the light oil, 250 g of sulfur and 100 g of the crushed granular sulfurized product (crushed into grains of a size less than 0.5 mm) obtained by the process of this invention and the reaction was carried out for 4 hours at 230° to 235° C under normal pressure with stirring at a rate of 900 r.p.m. When the reaction mixture was withdrawn from the reaction vessel and subjected to a centrifugal filtration, 410 g of a spherical granular sulfurized product and 313 g of a filtrate (recovered oil) were obtained. A part of the recovered oil was analyzed to determine the content of unreacted asphalt and light oil and thus the amounts of the propane deasphalting asphalt and the light oil consumed in the reaction were calculated.

Then, the fresh propane deasphalting asphalt and light oil in the amounts corresponding to the amounts of these components consumed added to the recovered oil and after adding thereto 180 g of sulfur and 100 g of the granular sulfurized product (crushed into grains of a size less than 0.5 mm), the reaction was conducted again. By repeating the same procedure, the recovered oil was repeatedly used five times, whereby the granular sulfurized product shown in Table 7 was obtained. From the results shown in Table 7, it can be understood that the recovered reaction medium (light oil) can be repeatedly used in situ without any difficulties.

Table 7

| | Number of Repeated Uses | | | | | |
|---|---|---|---|---|---|---|
| | 0 | 1 | 2 | 3 | 4 | 5 |
| Charged Amount (g) | | | | | | |
| Sulfur | 200 | 180 | 180 | 180 | 180 | 180 |
| Fresh Asphalt | 250 | 123 | 134 | 127 | 99 | 124 |
| Fresh Light Oil | 400 | 82 | 66 | 180 | 149 | 75 |
| Previously Recovered Oil | 0 | 313 | 444 | 351 | 461 | 370 |
| Formed Amount (g) | | | | | | |
| Recovered Oil | 313 | 444 | 351 | 461 | 370 | 392 |
| Granular Sulfurized Product | 410 | 312 | 349 | 347 | 430 | 328 |
| Grain Size Distribution of Granular Product (in wt. %) (mm) | | | | | | |
| <0.5 | 12 | 15 | 15 | 19 | 4 | 19 |
| 0.5–1.0 | 61 | 17 | 6 | 28 | 67 | 17 |
| 1.0–1.4 | 17 | 57 | 63 | 38 | 23 | 48 |
| 1.4–2.3 | 8 | 11 | 16 | 11 | 6 | 16 |
| 2.3–5.0 | 2 | 0 | 0 | 4 | 0 | 0 |
| >0.5 | 0 | 0 | 0 | 0 | 0 | 0 |

While the invention has been described in detail and with reference to specific embodiments thereof, it will be apparent to one skilled in the art that various changes and modifications can be made therein without departing from the spirit and scope thereof.

What is claimed is:

1. A process for producing an infusible and insoluble granular sulfurized material which comprises reacting for a time necessary to produce a firm dense granular material, a petroleum heavy material and sulfur with agitation in the presence of a reaction medium at a temperature ranging from about 170° C, to about 400° C, said sulfur being present in an amount of about 0.2 to 5 parts by weight per part by weight of said petroleum heavy material, said petroleum heavy material being a liquid or solid at normal temperature and having a softening point of lower than about 400° C, a boiling point higher than about 300° C, an H/C atomic ratio of about 0.2 to 1.9 and a carbon content of about 80 to 96% by weight, and said reaction medium being a hydrocarbon which is a liquid at normal temperature, which has a boiling point of from about 50° C to about 400° C, and which has a low reactivity with sulfur as compared with said petroleum heavy material and which is present in an amount such that the viscosity of the reaction system is less than about 2,000 CS; filtering the reaction mixture to separate an oily material and recover a solid granular sulfurized material.

2. The process as claimed in claim 1, wherein said petroleum heavy material is a residue obtained by distilling crude oil, a catalytic cracking residue of keresene, a catalytic cracking residue of a light oil, a thermal cracking residue of kerosene, a thermal cracking residue of a light oil, a naphtha cracking residue, a residue obtained from thermally cracking or hydrocracking a heavy petroleum fraction, a residue obtained from thermally cracking or hydrocracking a residual oil, or a mixture thereof.

3. The process as claimed in claim 2, wherein said petroleum heavy material is asphalt.

4. The process as claimed in claim 1, wherein said petroleum fraction is naphtha, kerosene, light oil or a mixture thereof.

5. The process as claimed in claim 1, wherein said reaction medium is an aromatic hydrocarbon, an aliphatic hydrocarbon, or a mixture thereof.

6. The process as claimed in claim 5, wherein said aromatic hydrocarbon is benzene, toluene, xylene, or tertiary-butylbenzene.

7. The process as claimed in claim 5, wherein said aliphatic hydrocarbon is hexane, cyclohexane, octane, or liquid paraffin.

8. The process as claimed in claim 1, wherein said reacting is in the presence of a Lewis acid metal halide as a catalyst in an amount of about 0.01 to 0.5 part by weight per part by weight sulfur.

9. The process as claimed in claim 1, wherein said reacting is in the presence of a solid carbonaceous material which is insoluble in said reaction system of said petroleum heavy material, said sulfur, and said reaction medium and infusible under said reaction conditions, said solid carbonaceous material being present in an amount of not more than about 2 parts by weight per part by weight of the total amount of said petroleum heavy material and said reaction medium.

10. A process of producing granular carbon which comprises carbonizing the infusible and insoluble granular sulfurized material obtained by the process as claimed in claim 1 by heating said granular sulfurized material to a temperature ranging from about 400° C. to about 1200° C. In an inert gas atmosphere.

11. A process of producing a granular activated carbon which comprises activating the granular carbon obtained by the process as claimed in claim 10 by heating said granular carbon to a temperature ranging from about 700° C. to about 1300° C. under a mild oxidizing atmosphere.

12. A process for producing granular carbon which comprises carbonizing the infusible and insoluble granular sulfurized material obtained by the process as claimed in claim 9 by heating said granular sulfurized material to a temperature ranging from about 400° C. to about 1200° C. in an inert gas atmosphere.

13. A process for producing granular activated carbon which comprises activating the granular carbon obtained by the process as claimed in claim 12 by heating said granular carbon to a temperature ranging from about 700° C. to about 1300° C. under a mild oxidizing atmosphere.

14. The process of claim 1 wherein the reaction is carried out for 3 to 6 hours.

* * * * *